Jan. 2, 1923.    1,440,392
W. F. KASPER.
SLIDING BASE FOR BELT DRIVEN MOTOR CARS.
ORIGINAL FILED JAN. 3, 1922.

INVENTOR
WALTER F. KASPER
By Paul Paul
Attorneys

Patented Jan. 2, 1923.

1,440,392

UNITED STATES PATENT OFFICE.

WALTER F. KASPER, OF FAIRMONT, MINNESOTA, ASSIGNOR TO FAIRMONT GAS ENGINE & RAILWAY MOTOR CAR CO., OF FAIRMONT, MINNESOTA, A CORPORATION OF MINNESOTA.

SLIDING BASE FOR BELT-DRIVEN MOTOR CARS.

Application filed January 3, 1922, Serial No. 526,765. Renewed August 11, 1922. Serial No. 581,260.

*To all whom it may concern:*

Be it known that I, WALTER F. KASPER, a citizen of the United States, resident of Fairmont, county of Martin, State of Minnesota, have invented certain new and useful Improvements in Sliding Bases for Belt-Driven Motor Cars, of which the following is a specification.

My invention relates to a sliding base for use in connection with a railway motor car gas engine and the object of my invention is to provide means for drawing the engine pulley into the belt through which the motor car is driven, to the end that the belt will be kept taut and substantially the full power of the engine transmitted to the truck wheels.

Other objects of the invention will appear from the following detailed description.
The invention consists generally in various constructions and combinations, all as hereinafter described and particularly pointed out in the claims.

Figure 1:
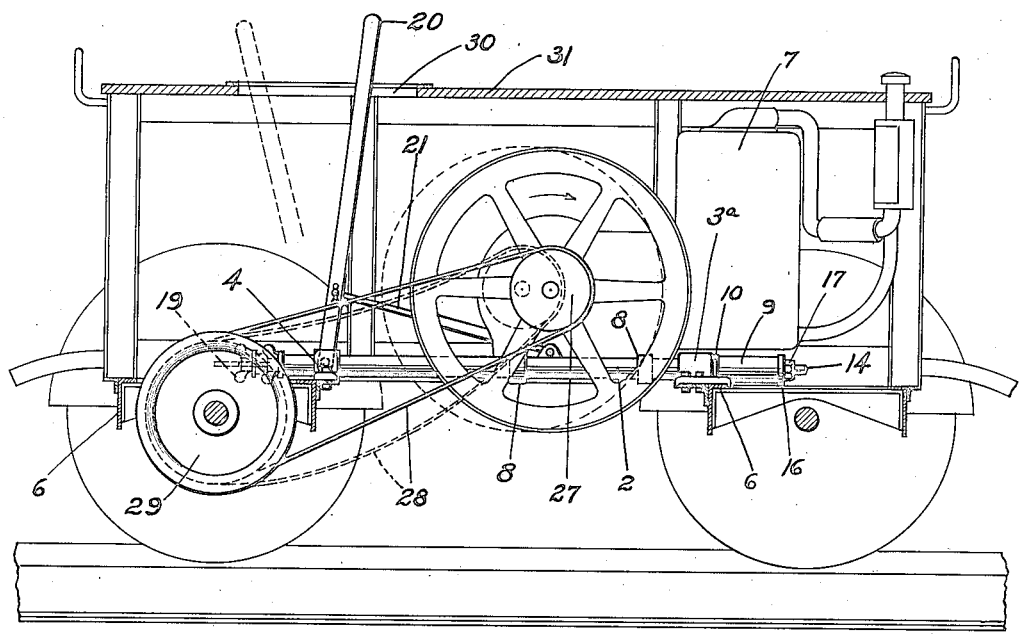
Figure 2:
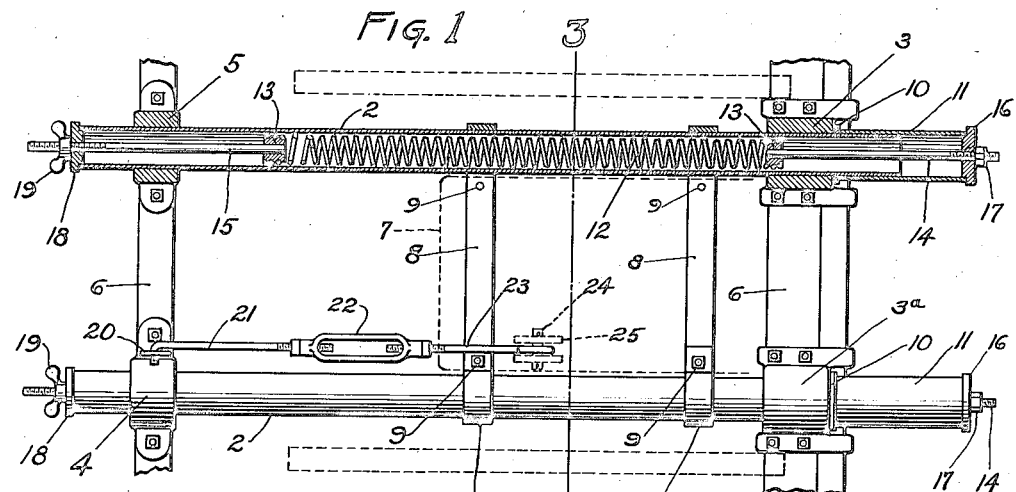
Figures 3, 4:
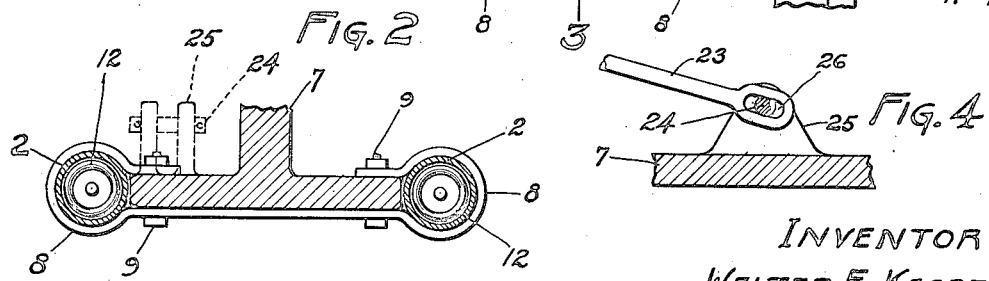

In the accompanying drawings forming part of this specification,

Figure 1 is a side elevation illustrating the application of my invention to a railway motor car, Figure 2 is a plan view, partially in section, showing the arrangement of the invention on the truck frame, Figure 3 is a sectional view on the line 3—3 of Figure 2, Figure 4 is a detail view, showing the connection between the engine base and the operating lever.

In the drawing, 2 represents a pair of tubes arranged in parallel relation in bearings 3, 3ª, 4 and 5 which are secured by suitable means to the frame 6 of the car. 7 represents the engine, securely clamped to the tubes 2 by suitable means, such as straps 8 and bolts 9. The tubes 2 project through the forward bearings 3 and 3ª and over the end of each tube I place a bearing washer 10 and a short slidable tube section 11. Within each tube I provide a spiral compression spring 12 having plugs 13 secured therein at each end and threaded rods 14 and 15 are mounted in these plugs and project outwardly through caps 16 and 18 in the ends of the tubes 2 and 11. Nuts 17 are mounted on the rods 14 and seated against the caps 16 and wing nuts 19 are mounted on the rods 15 and seated against the cap 18. By means of the wing nuts 19 the initial tension of the springs 12 may be increased or diminished. A lever 20 is mounted on the bearing 4 and is connected with the engine base by a rod 21, turn-buckle 22, eye-bolt 23, and pin 24, the latter fitting within a pair of ears 25 on the engine base and the eye-bolt having an elongated opening 26 therein so that the vibration of the engine will not be transmitted to the sliding base lever. When the wing nuts are tightened, the springs will be put under tension and the tubes moved toward the right in the sleeves 11 and engine base, being mounted on the tubes, will move in the same direction, drawing the pulley 27 mounted on the crank shaft of the engine into the belt 28 to tighten the pulley 29 that is connected with the railway car axle. In this way I am able to take up the slack in the driving belt, compensating for stretch thereof and preventing slippage when the car is in use. Whenever desired, the lever 20 may be moved to the dotted line position in Figure 1, thereby pulling the engine and its pulley back, clear of the belt, and at such time the lever may be held in its dotted line position by a suitable catch provided in the opening 30 in the seat 31 on the frame of the car above the engine.

I claim as my invention:

1. The combination, with a frame, of a pair of tubes arranged in parallel relation therein, an internal combustion engine having its base connected with said tubes and provided with a pulley and belt therefor, said tubes being mounted for longitudinal movement and means for yieldingly drawing said pulleys into said belt to tension it.

2. The combination, with a frame, of tubes mounted to slide longitudinally therein, stationary sleeves wherein one end of said tubes is slidable, means for yieldingly drawing said tubes into said sleeves, an engine having its base connected with said tubes and provided with a pulley and belt therefor, and a lever mechanism for moving said engine and tubes and said pulley to release said belt.

3. The combination, with a frame, of tubes slidable therein, helical springs arranged in said tubes, means connecting one end of said springs with said frame, means for increasing or decreasing the tension of said springs, an engine base connected with said tubes, and having a pulley and belt therefor, and a lever mechanism for moving said engine base and tubes against the tension of said springs to release said belt.

4. The combination, with a frame, of tubes mounted for longitudinal movement therein, spiral springs arranged in said tubes, threaded rods connected with the opposite ends of said springs, caps mounted on said tubes and through which said threaded rods project, wing nuts provided on the threaded rods at one end of said tubes for adjusting the tension of said springs, an engine having its base connected with said tubes and provided with a pulley and belt therefor, the tension of said springs drawing said pulley into said belt, and means for moving said engine and tubes in the opposite direction to relieve the tension on said belt.

5. The combination, with a truck frame having track wheels and a motor mounted on said frame and provided with a pulley and a belt connecting it with one of said track wheels, of a movable base supported on said truck frame and whereon said motor is mounted, springs for normally drawing said base in one direction to tighten said belt, and a mechanism for moving said base and motor in the opposite direction to release said belt.

6. The combination of a truck frame having track wheels, and a motor provided with a pulley and a belt connecting it with one of said track wheels, of a movable base supported on said truck frame and whereon said motor is mounted, means for normally drawing said base in one direction to tighten said belt, and a mechanism for moving said base and motor in the opposite direction to release said belt.

7. The combination, with a frame, of a pair of tubular guides arranged in parallel relation therein, sleeves wherein said guides are slidable, a motor having its base connected with said guides, and provided with a pulley and belt therefor, said guides being mounted for longitudinal movement, and means for yieldingly drawing said pulley into said belt to tension it.

8. The combination, with a frame, of guides mounted to slide longitudinally therein, stationary members wherein one end of said guides is slidable, means for yieldingly drawing said guides into said members, an engine having its base connected with said guides and provided with a pulley and belt therefor, and mechanism for moving said engine and guides, and said pulley to release said belt.

9. The combination with a frame, of guides slidable therein, springs arranged in said guides and connected with said frame, means for increasing and decreasing the tension of said springs, a motor base connected with said guides and having a pulley and belt therefor, and a lever mechanism for moving said base and guides against the tension of said springs to release said belt.

In witness whereof, I have hereunto set my hand this 27th day of December, 1921.

WALTER F. KASPER.